（12）United States Patent
Won et al.

(10) Patent No.: US 8,223,509 B2
(45) Date of Patent: Jul. 17, 2012

(54) INTEGRATED TRANSFORMER AND POWER SUPPLY USING THE SAME

(75) Inventors: Jae Sun Won, Gyunggi-Do (KR); Hwi Beom Shin, Gyeongsangnam-Do (KR); Hyung Ran Lee, Gyeongsangnam-Do (KR); Dong Seong Oh, Incheon (KR); Tae Won Heo, Gyunggi-Do (KR); Don Sik Kim, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 899 days.

(21) Appl. No.: 12/209,139

(22) Filed: Sep. 11, 2008

(65) Prior Publication Data

US 2009/0231885 A1    Sep. 17, 2009

(30) Foreign Application Priority Data

Mar. 17, 2008   (KR) ........................ 10-2008-0024330

(51) Int. Cl.
*H02M 3/335* (2006.01)
*H01F 27/24* (2006.01)

(52) U.S. Cl. ............................ 363/17; 323/250; 336/182

(58) Field of Classification Search .................. 323/250, 323/251, 252, 255; 363/17, 98, 132; 336/170, 336/178, 182, 215

See application file for complete search history.

(56) References Cited

U.S. PATENT DOCUMENTS

| 4,853,668 | A | 8/1989 | Bloom |
| 5,066,900 | A | 11/1991 | Bassett |
| 5,555,494 | A | 9/1996 | Morris |
| 6,784,644 | B2 * | 8/2004 | Xu et al. ..................... 323/225 |
| 6,980,077 | B1 | 12/2005 | Chandrasekaran et al. |
| 7,016,203 | B2 | 3/2006 | Xu et al. |
| 2007/0051712 | A1 * | 3/2007 | Kooken et al. ............. 219/130.1 |
| 2009/0185398 | A1 * | 7/2009 | Cuk ............................ 363/21.1 |

FOREIGN PATENT DOCUMENTS

KR        100186776  B1    5/1999

OTHER PUBLICATIONS

Korean Office Action for Application No. 10-2008-0024330, issued Jan. 29, 2010.

* cited by examiner

*Primary Examiner* — Jessica Han
(74) *Attorney, Agent, or Firm* — Lowe, Hauptman, Ham & Berner, LLP (57) ABSTRACT

There are provided an integrated transformer in which a power conversion transformer and an inductor for stabilizing output power by the transformer are integrated into one transformer structure, and a power supply using the same. An integrated transformer according to an aspect of the invention includes: a core part including: first and second supports; and first and second outer legs and a center leg provided between the first and second supports, and magnetically connecting the first and second supports to each other, wherein a cross-section of the first and second outer legs and a cross-section of the center leg have a width of the first support and a width of the second support in a longitudinal direction, respectively, and a width of each of the first and second outer legs exceeds 0.5 times a width of the center leg but does not exceed 2 times the width of the center leg.

17 Claims, 13 Drawing Sheets

INTEGRATED TRANSFORMER AND POWER SUPPLY USING THE SAME

CROSS-REFERENCE TO RELATED APPLICATIONS

This application claims the priority of Korean Patent Application No. 2008-0024330 filed on Mar. 17, 2008, in the Korean Intellectual Property Office, the disclosure of which is incorporated herein by reference.

BACKGROUND OF THE INVENTION

1. Field of the Invention

The present invention relates to integrated transformers, and more particularly, to an integrated transformer in which a power conversion transformer and an inductor for stabilizing output power by the transformer are integrated into one transformer structure, and a power supply using the same.

2. Description of the Related Art

In general, power supplies that convert commercial AC power into DC power and provide the DC power are widely used in home appliances, such as information devices including personal computers, air conditioners, and audio and visual devices.

With the development of home appliances, power supplies that output DC power of hundreds of watts (W) or more are required. As described above, while the power supply outputs high DC power, the power supplies also need to be small, lightweight, and thin.

In order to satisfy the needs, a transformer that is a magnetic element used for power conversion and an output inductor that stabilizes the converted power in the power supply need to be integrated.

Figure 1:
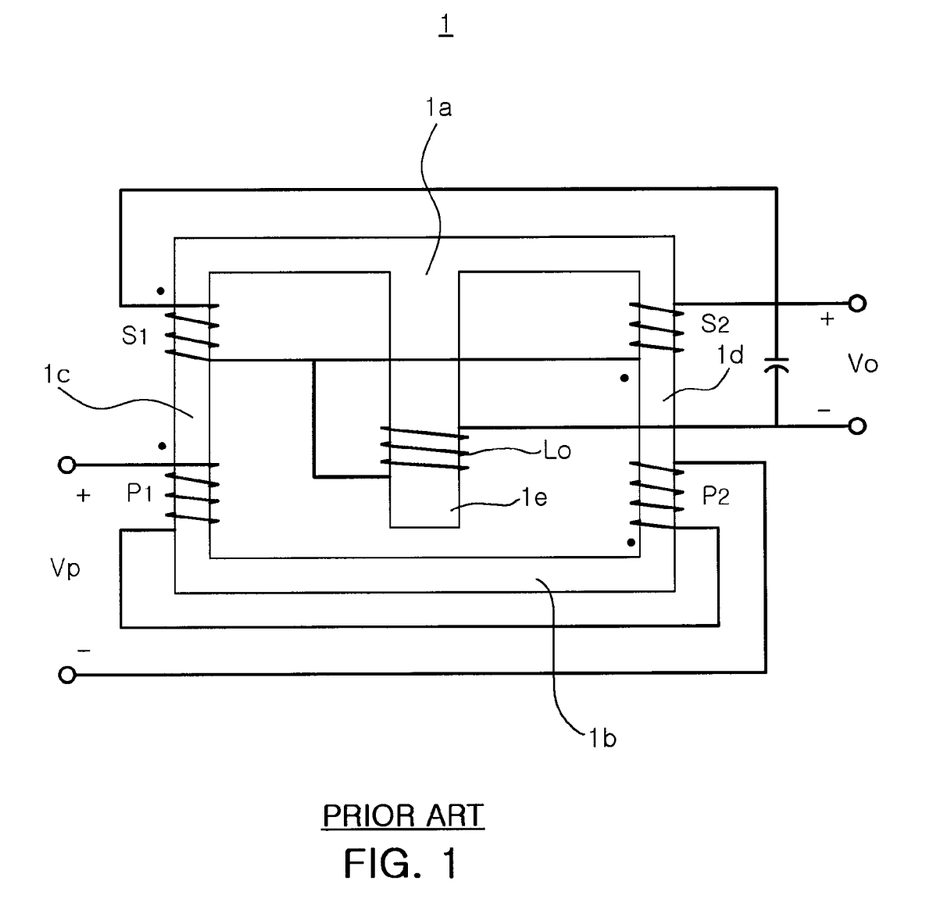
FIG. 1 is a configuration view illustrating an integrated transformer according to the related art.

FIG. 1 is a view illustrating an integrated transformer structure into which a transformer and an output inductor are integrated according to the related art.

Referring to FIG. 1, an integrated transformer 1 according to the related art includes a magnetic core and windings.

The magnetic core includes first and second supports $1a$ and $1b$, first and second outer legs $1c$ and $1d$, and a center leg $1e$. Each of the first and second supports $1a$ and $1b$ facing each other includes one end and the other end and has a predetermined length. The first and second outer legs $1c$ and $1d$ and the center leg $1e$ extend from the first and second supports $1a$ and $1b$, and magnetically couple the first and second supports $1a$ and $1b$ to each other.

The windings include primary windings P1 and P2, secondary windings S1 and S2, and an inductor coil Lo, and the secondary windings S1 and S2 are electromagnetically coupled to the primary windings P1 and P2, respectively. The inductor coil Lo corresponds to the above-described output inductor. The primary windings P1 and P2 and the secondary windings S1 and S2 correspond to the power conversion transformer.

The primary winding P1 and the secondary winding S are wound on the first outer leg $1c$. The primary winding P2 and the secondary winding S2 are wound on the second outer leg $1d$. An inductor winding of the inductor coil Lo is wound on the center leg $1e$.

The integrated transformer according to the related art has disadvantages as follows.

First, a commercial EE core or a commercial EI core is used as the magnetic core. The primary windings P1 and P2 and the secondary windings S and S2 that are used to perform power conversion are wound on the outer legs $1c$ and $1d$ having a smaller cross-sectional area than the center leg $1e$. DC magnetic flux generated by the inductor winding Lo of the center leg $1e$ and AC magnetic flux generated by the primary windings P1 and P2 and the secondary windings S1 and S2 are put together to significantly increase magnetic flux density of the outer legs $1c$ and $1d$. Since DC components are included in the magnetic flux of the primary windings P1 and P2 and the secondary windings S1 and S2, the transformer can be easily magnetically saturated by AC asymmetrical operation or a small asymmetrical circuit element of the power supply.

Second, since the inductor winding Lo is only wound on the center leg $1e$, the magnetic flux generated by the inductor flows through the center leg $1e$, and the center leg $1e$ has a larger cross-sectional area than that of the outer legs $1c$ and $1d$, which causes very low core loss. Therefore, the most amount of core loss occurs in the outer legs $1c$ and $1d$ on which the primary windings P1 and P2 and the secondary windings S1 and S2 are wound. As a result, thermal unbalance occurs between the outer legs $1c$ and $1d$ and the center leg $1e$.

Third, since the primary windings P1 and P2 and the secondary windings S1 and S2 are wound around the outer legs $1c$ and $1d$, when the number of turns of the windings is high, the magnetic flux may leak to the outside since there is no core to wound on, which may cause electromagnetic interference. Further, since the windings of the transformer are divided into two, a coupling coefficient between the primary windings P1 and P2 and the secondary windings S1 and S2 is low.

SUMMARY OF THE INVENTION

An aspect of the present invention provides an integrated transformer in which primary and secondary windings corresponding to a power conversion transformer are wound on a center leg, and an inductor winding stabilizing output power by the transformer is divided into two and wound on outer legs so that the power conversion transformer and the inductor are integrated into one transformer structure, and a power supply using the same.

According to an aspect of the present invention, there is provided an integrated transformer including: a core part including: first and second supports each having a predetermined length and separated from each other by a predetermined distance, the first and second supports each having one end, the other end provided at a side opposite to the one end, and a middle end provided between the one end and the other end; and first and second outer legs and a center leg provided between the first and second supports and magnetically coupled with the first and second supports, the first and second outer legs connecting one set of ends and the other set of ends of the first and second supports to each other, the center leg magnetically connecting the middle ends of the first and second supports to each other; and a coil part including a primary winding wound on the center leg, a secondary winding wound on the center leg and electrometrically coupled to the primary winding, and an inductor winding wound on at least one of the first and second outer legs to stabilize power by electromagnetic interaction between the primary and secondary windings, wherein a cross-section of the first and second outer legs and a cross-section of the center leg have a width of the first support and a width of the second support in a longitudinal direction, respectively, and a width of each of the first and second outer legs exceeds 0.5 times a width of the center leg but does not exceed 2 times the width of the center leg.

The core part may be configured by coupling an EE core or an EI core.

The primary winding, the secondary winding, and the inductor winding may be wound in the same direction.

The inductor winding may be divided and wound on the first and second outer legs.

The secondary winding may be provided with a center tap electrically connected to the inductor winding.

According to another aspect of the present invention, there is provided a power supply using an integrated transformer, the power supply including: a switching unit alternately switching input DC power to convert the input DC power into AC power; a transformation unit converting a voltage level of the AC power from the switching unit according to a predetermined turns ratio; a rectification unit rectifying the AC power from the transformation unit and outputting DC power; and a control unit controlling a switching duty of the switching unit according to a voltage level of the DC power from the rectification unit, wherein the transformation unit includes: a core part including: first and second supports each having a predetermined length and separated from each other by a predetermined distance, the first and second supports each having one end, the other end provided at a side opposite to the one end, and a middle end provided between the one end and the other end; and first and second outer legs and a center leg provided between the first and second supports and magnetically coupled with the first and second supports, the first and second outer legs connecting one set of ends and the other set of ends of the first and second supports to each other, the center leg magnetically connecting the middle ends of the first and second supports to each other; and a coil part including a primary winding wound on the center leg, a secondary winding wound on the center leg and electrometrically coupled to the primary winding, and an inductor winding wound on at least one of the first and second outer legs to stabilize power by electromagnetic interaction between the primary and secondary windings.

The cross-section of the first and second outer legs and a cross-section of the center leg may have a width of the first support and a width of the second support in a longitudinal direction, respectively, and a width of each of the first and second outer legs may exceed 0.5 times a width of the center leg but may not exceed 2 times the width of the center leg.

The core part may be configured by coupling an EE core or an EI core.

The primary winding, the secondary winding, and the inductor winding may be wound in the same direction.

The inductor winding may be divided and wound on the first and second outer legs.

The secondary winding may be provided with a center tap electrically connected to the inductor winding.

The switching unit may select one from a full-bridge method, a half-bridge method, and a push-pull method.

The rectification unit may rectify the AC power from the transformation unit by using a full-wave rectification method or a half-wave rectification method.

The rectification unit may include: first and second switches rectifying the AC power from the secondary winding of the transformation unit; and a capacitor forming an LC filter together with the inductor winding to stabilize the power rectified by the first and second switches.

The switch may be formed of a diode or a semiconductor switching device including a metal oxide semiconductor field-effect transistor (MOSFET).

The control unit may control a switching duty of the switching unit by using a phase shift pulse width modulation (PWM) method.

The power supply may include a power factor correction unit rectifying commercial AC power, correcting a power factor of the AC power, and supplying the input DC power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 2:
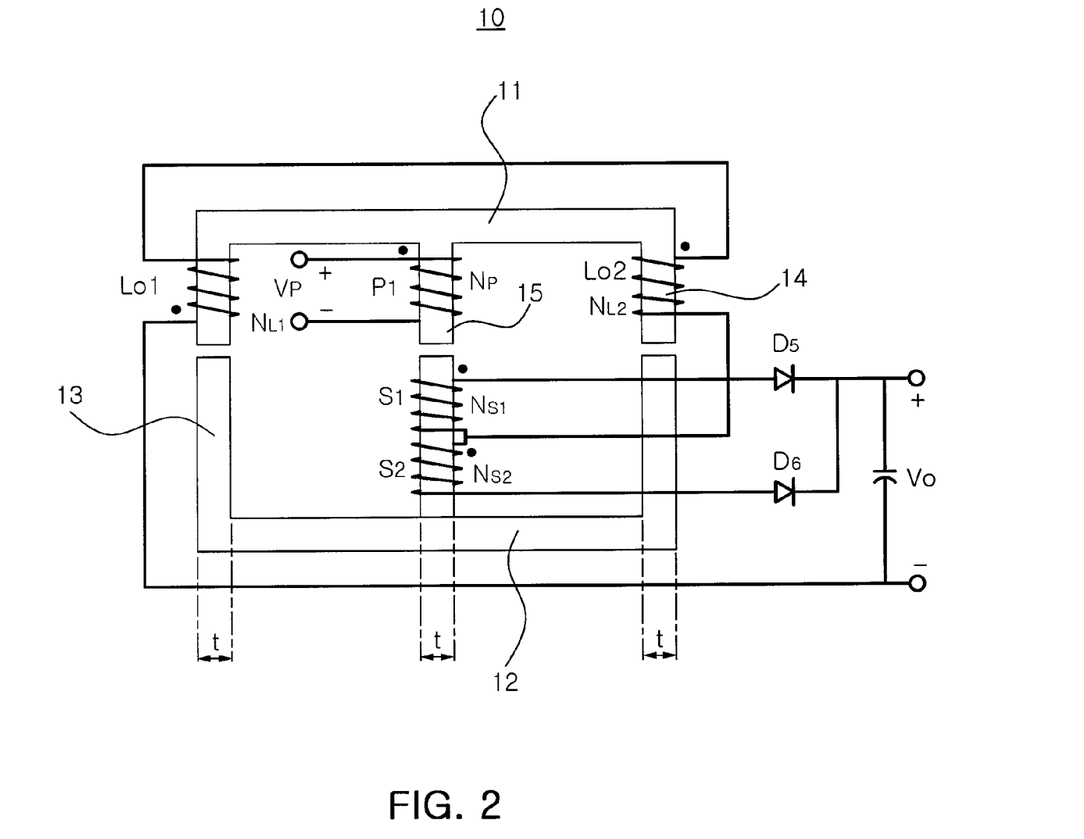
FIG. 2 is a configuration view illustrating an integrated transformer according to an exemplary embodiment of the invention.

FIG. 2 is a configuration view illustrating an integrated transformer according to an exemplary embodiment of the present invention.

Referring to FIG. 2, the integrated transformer according to this embodiment of the invention includes a core part formed of a magnetic element and a coil part wound on the core part.

The core part includes supports and legs.

The supports are a first support 11 and a second support 12. Each of the first and second supports 11 and 12 includes a magnetic element having a predetermined length, and has one end in a longitudinal direction, the other end formed in a direction opposite to the longitudinal direction of the one end, and a middle end located between the one end and the other end.

The legs are first and second outer legs 13 and 14 and a center leg 15. The first outer leg 13 magnetically connects one set of ends of the first and second supports 11 and 12 to each other. The second outer leg 14 magnetically connects the other set of ends of the first and second supports 11 and 12 to each other. The center leg 15 magnetically connects the middle ends of the first and second supports 11 and 12 to each other. Air gaps that determine inductance of the transformer may be provided at the first and second outer legs 13 and 14 and the center leg 15.

Figure 3:
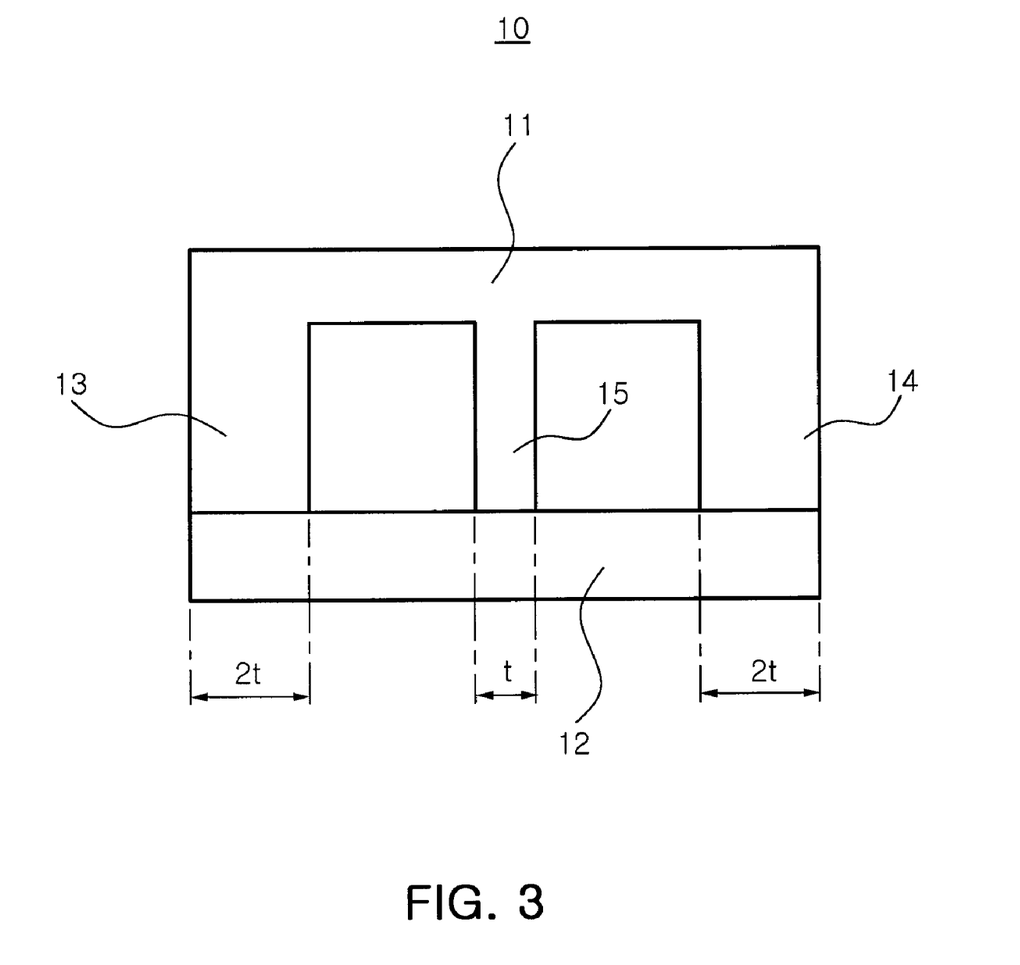
FIG. 3 is a configuration view illustrating an integrated transformer according to another exemplary embodiment of the invention.

The core part has an EE core structure. However, preferably, a cross-sectional width t of each of the first and second outer legs 13 and 14 exceeds 0.5 times greater than a cross-sectional width t of the center leg 15 unlike a commercialized EE core in the art. As shown in FIG. 2, in consideration of mass production, the cross-sectional width t of each of the first and second outer legs 13 and 14 may be the same as the cross-sectional width t of the center leg 15. Alternatively, as shown in FIG. 3, in the EI core structure, a cross-sectional width 2t of each of the first and second outer legs 13 and 14 may be twice greater than a cross-sectional width t of the center leg 15.

Electrical characteristics of the cross-sectional width of the first and second outer legs 13 and 14 and the cross-sectional width of the center leg 15 will be described with reference to FIG. 10.

The coil part includes a primary winding P1 and secondary windings S1 and S2 for power conversion and inductor windings Lo1 and Lo2 for output power stabilization.

The primary winding P1 and the secondary windings S1 and S2 are wound on the center leg 15 of the core part. The inductor windings Lo1 and Lo2 are wound on the first and second outer legs 13 and 14, respectively.

The secondary windings S1 and S2 may have a center tap that is electrically connected to the inductor windings Lo1 and Lo2. The inductor windings Lo1 and Lo2 may be wound on at least one of the first and second outer legs 13 and 14. Preferably, in consideration of heat balance, the inductor windings Lo1 and Lo2 are wound on the first and second outer legs 13 and 14, respectively, (Np, in FIG. 2, represents the number of turns of the primary winding P1, Ns1 and Ns2 represent the number of turns of the secondary windings S1 and S2, respectively, and NL1 and NL2 represent the number of turns of the inductor windings Lo1 and Lo2, respectively).

Though not shown in the drawing, in the integrated transformer, the core part is coupled to a bobbin, which an electric insulator, and the coil part is wound on the bobbin. However, since this is obvious to a person skilled in the art, a description thereof will be omitted.

Figure 4:
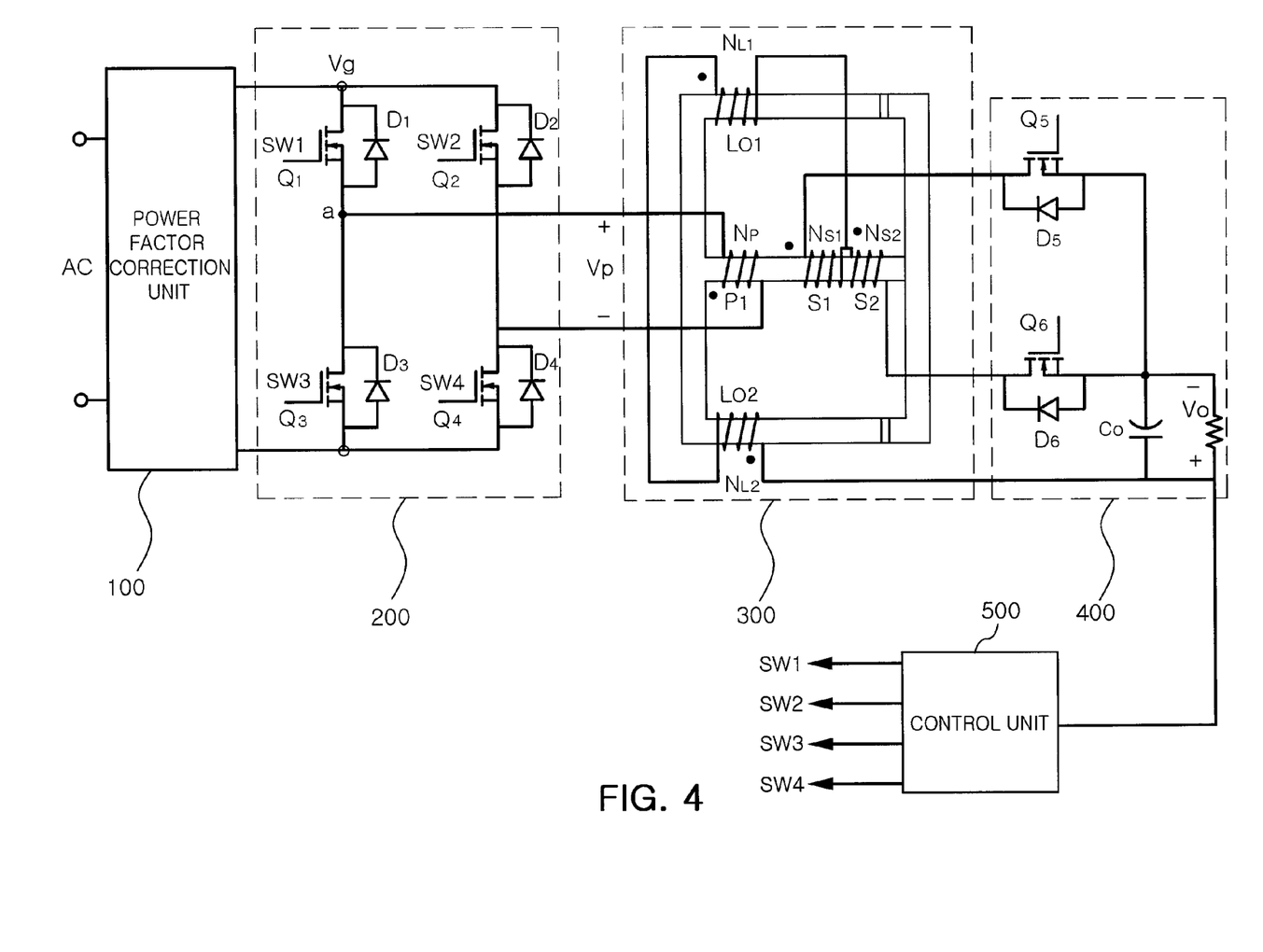
FIG. 4 is a configuration view illustrating a power supply using the integrated transformer according to the exemplary embodiment of the invention.

FIG. 4 is a configuration view illustrating a power supply using an integrated transformer according to an exemplary embodiment of the present invention.

Referring to FIG. 4, a power supply according to this embodiment of the invention includes a power factor correction unit 100, a switching unit 200, a transformation unit 300, a rectification unit 400, and a control unit 500.

The power factor correction unit 100 rectifies commercial AC power, corrects a power factor, and transmits DC power Vg to the switching unit 200.

The switching unit 200 includes four switches Q1, Q2, Q3, and Q4 that are connected in full bridge configuration. The switching unit 200 having the four switches Q1, Q2, Q3, and Q4 performs an alternate switching operation according to switching control signals sw1, sw2, sw3, and sw4, converts the DC power Vg into AC power, and transmits the AC power to the transformation unit 300 (D1 to D4 represent body diodes of the switches Q1 to Q4).

The transformation unit 300 includes the integrated transformer, shown in FIG. 2, transforms a voltage level of the AC power from the switching unit 200 according to a turns ratio between the primary winding P1 and the secondary windings S1 and S2, and transmits the AC power having the transformed voltage level to the rectification unit 400.

In consideration of conduction loss, the rectification unit 400 includes two switches Q5 and Q6, including the body diodes D5 and D6, respectively, in half wave reification. The rectification unit 400 rectifies the AC power from the transformation unit 300, and converts the rectified AC power to DC power Vo having a predetermined voltage level. At this time, the rectification unit 400 includes a capacitor Co at an output terminal thereof to form an LC filter together with the inductor windings Lo1 and Lo2 of the transformation unit 300, thereby stabilizing the DC power Vo.

The control unit 500 supplies to the switching unit 200, the switching control signals sw1, sw2, sw3, and sw4 for variable control of a switching duty during the alternate switching operation according to the voltage level of the DC power Vo from the rectification unit 400. The control unit 500 may perform switching control by phase shift pulse width modulation. That is, the control unit 500 can control the switching operation by using phase shift pulse width modulation (PWM) that varies the switching duty by shifting phases of the switching control signals sw1, sw2, sw3, and sw3 according to the voltage level of the DC power Vo.

Figure 5A:
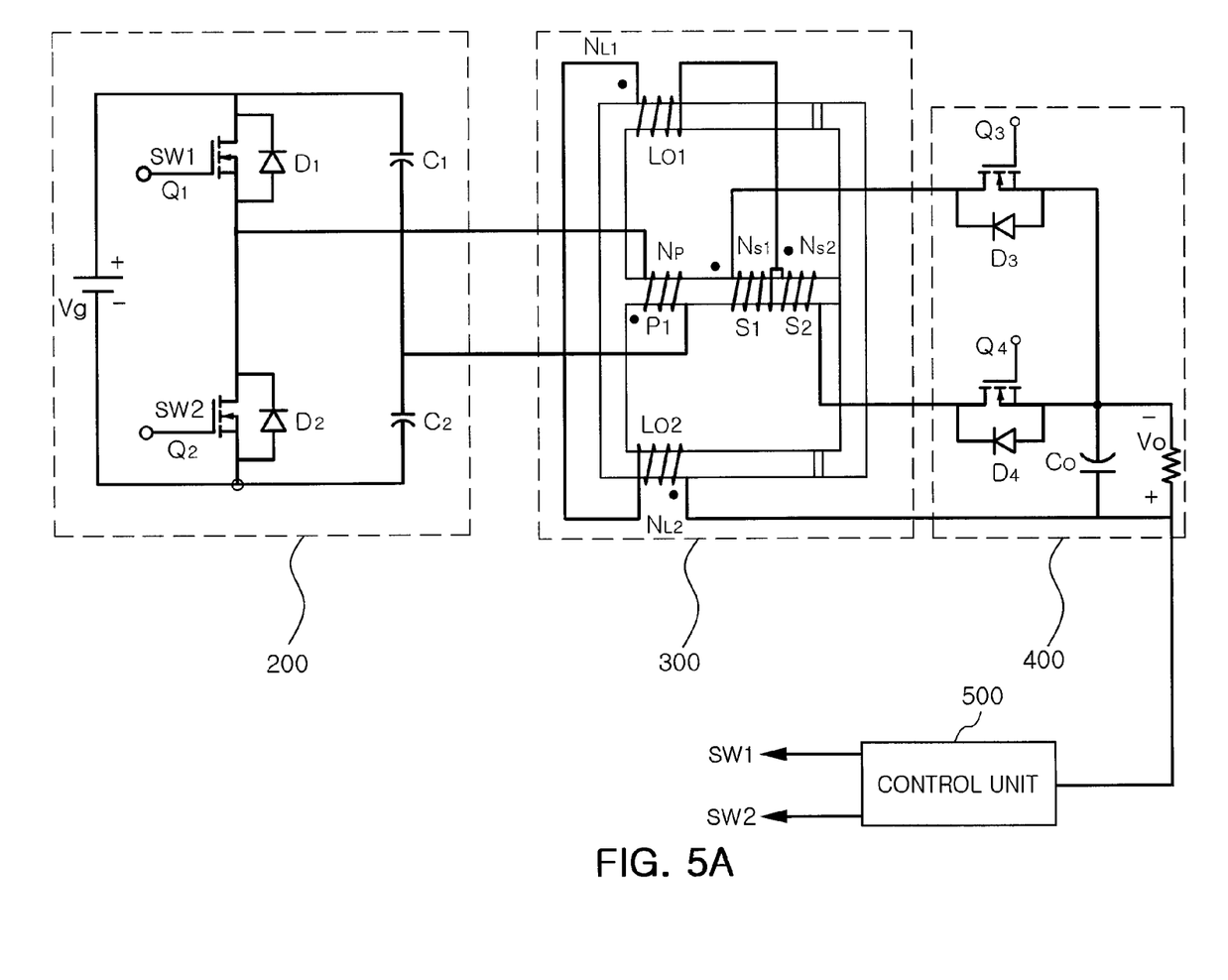
FIGS. 5A to 5C are configuration views illustrating power supplies according to other exemplary embodiments of the invention.
Figure 5B:
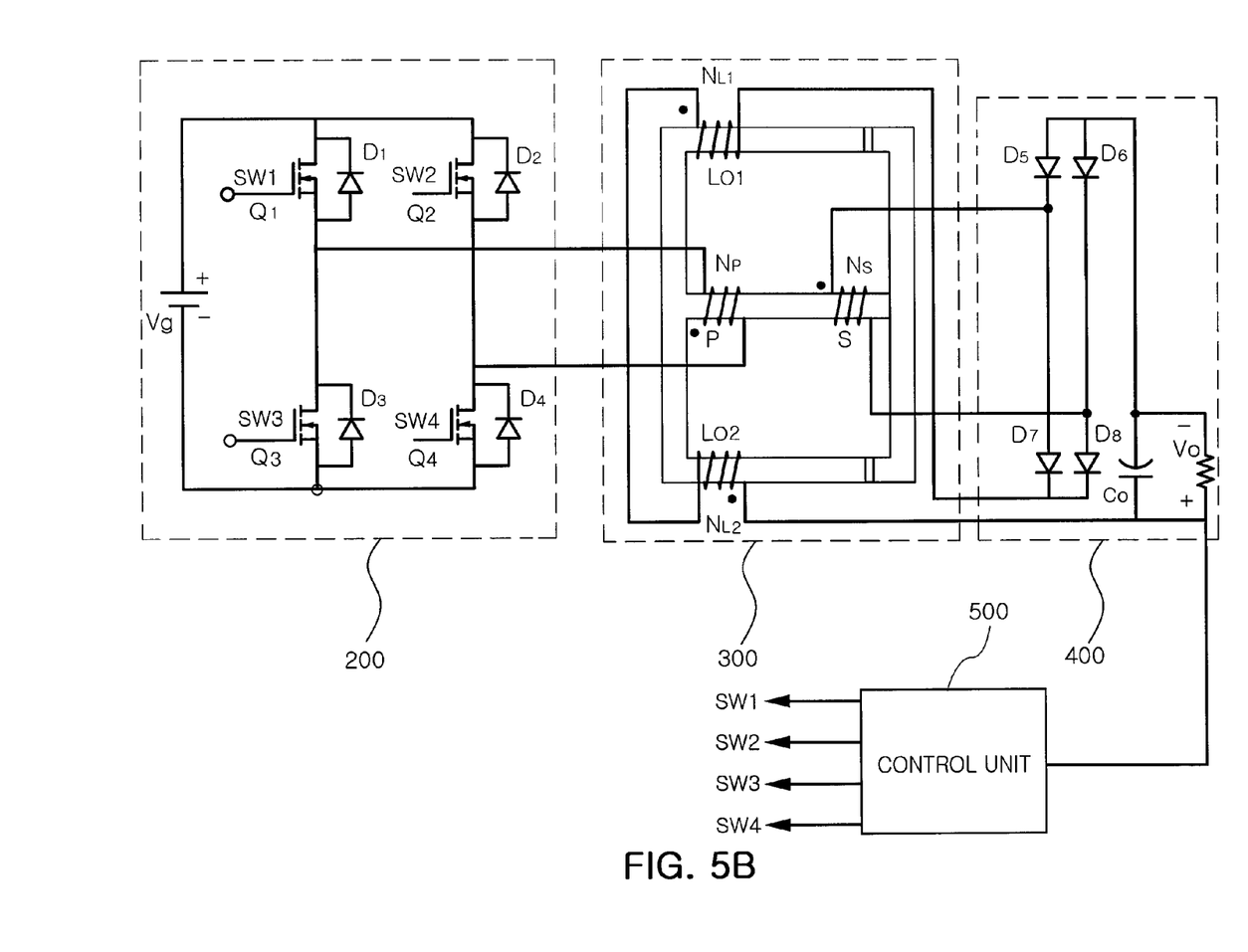
Figure 5C:
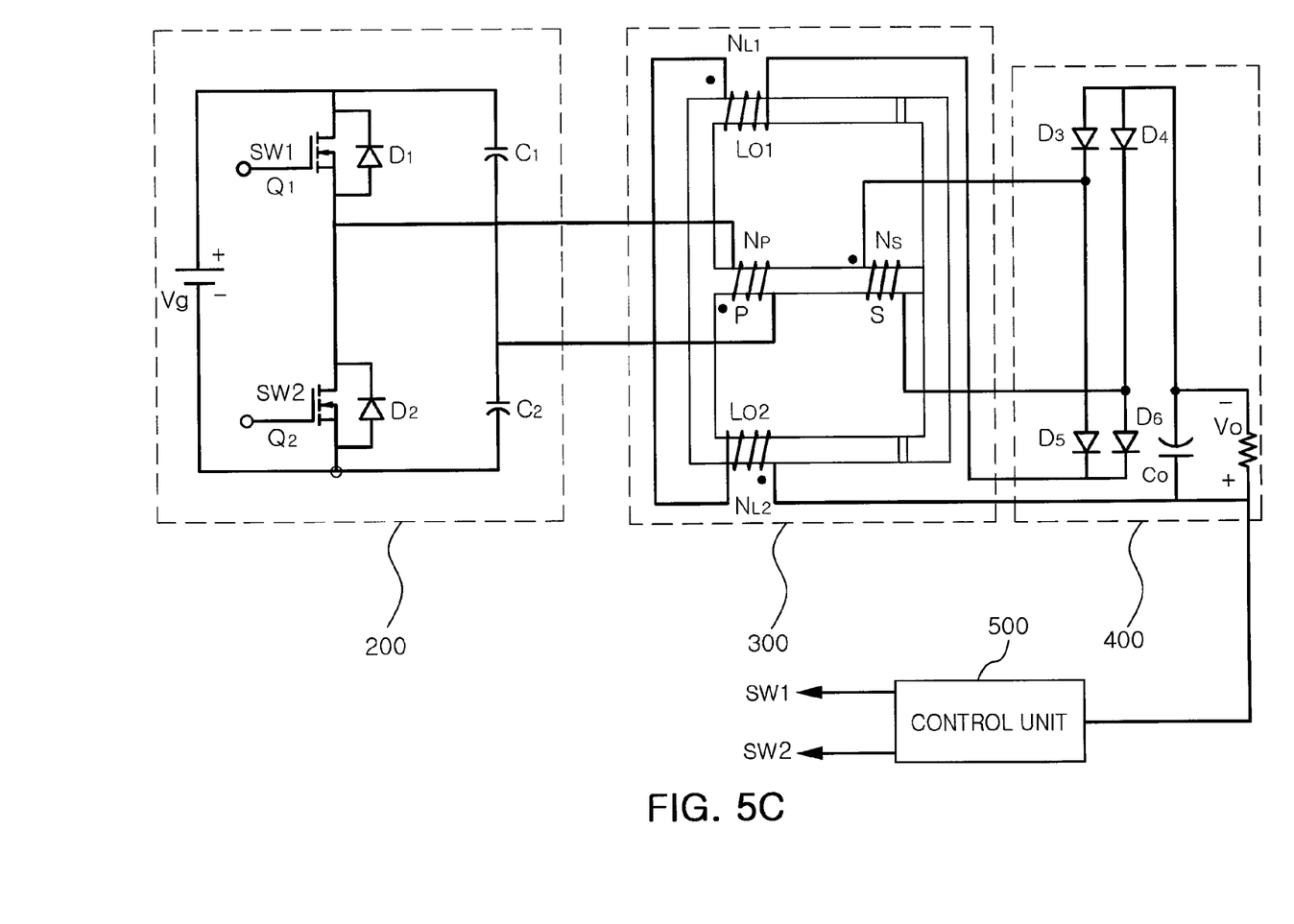

FIGS. 5A to 5C are configuration views illustrating power supplies according to other exemplary embodiments of the invention.

Referring to FIGS. 2 to 4, and 5A to 5C, the switching unit 200 may have a half-bridge configuration in which two switches Q1 and Q2 are connected in parallel with an input DC power Vg terminal (refer to FIGS. 5A and 5C).

Further, the integrated transformer of the transformation unit 300 may include a primary windings P and a secondary winding S where a center tap is not formed (refer to FIG. 5B). The rectification unit 400 may have a half wave rectification configuration in which two switches Q3 and Q4 are connected to the secondary windings S1 and S2 of the transformation unit 300, respectively (refer to FIGS. 5A). Alternatively, the rectification unit 400 may have a full wave rectification configuration in which four diodes D3 to D6 or D5 to D8 are connected to the secondary winding S (refer to FIGS. 5B and 5C).

Figure 6:
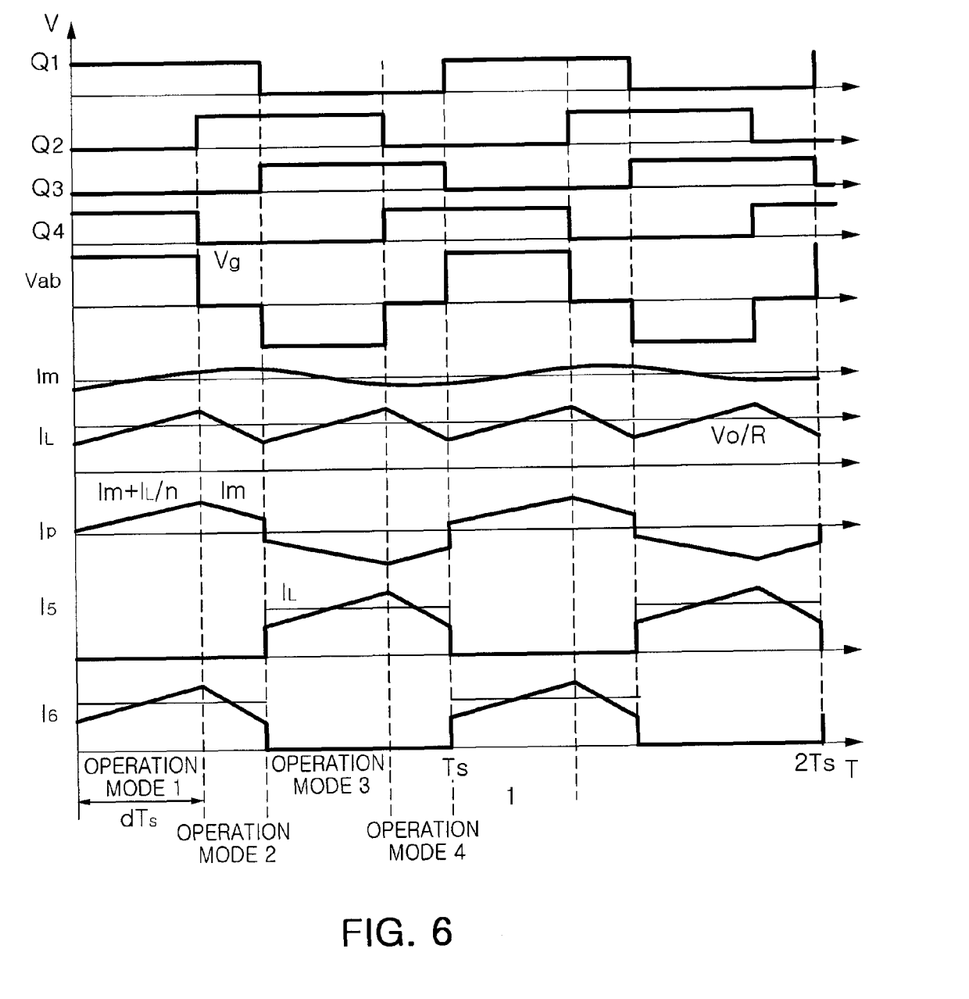
FIG. 6 is an operating waveform of the power supply of FIG. 4.

FIG. 6 is an operation waveform of the power supply of FIG. 4.

Referring to FIGS. 4 and 6, operation waveforms of important parts of the power supply according to the embodiment of the invention are shown.

Figure 7A:
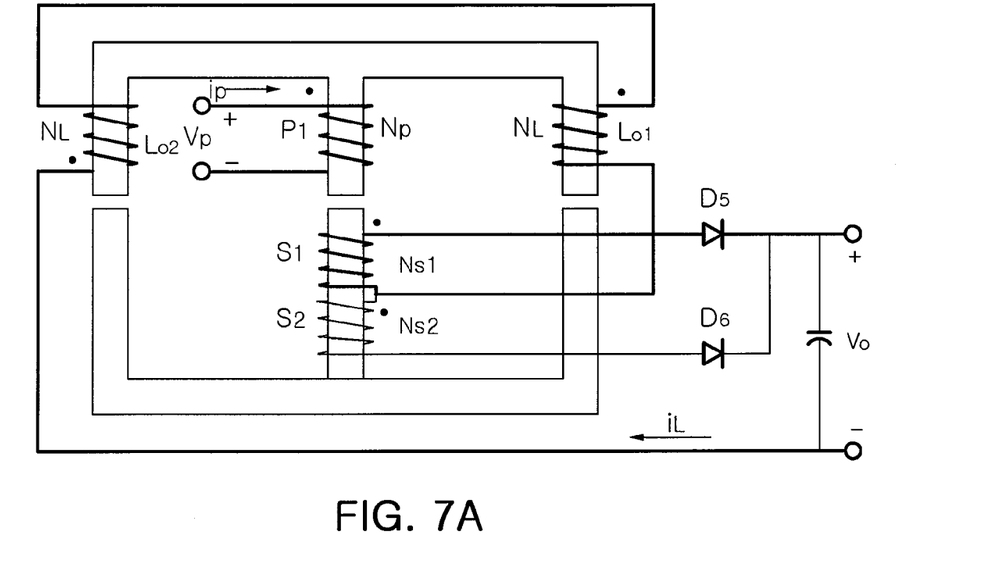
FIGS. 7A and 7B are views illustrating an operation in operation mode 1 shown in FIG. 6.
Figure 7B:
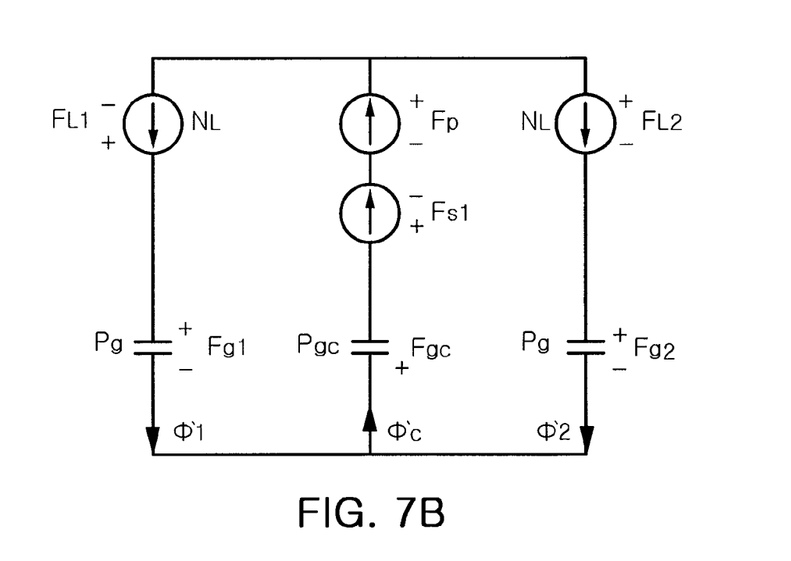

FIGS. 7A and 7B are views illustrating the operation in operation mode 1 shown in FIG. 6.

Referring to FIGS. 4 and 6, in operation mode 1 (refer to FIG. 6), the first switch Q1 and the fourth switch Q4 of the switching unit 200 are turned on at the same time, and the fifth switch Q5 of the rectification unit 400 is turned on. A positive DC voltage is applied to the secondary windings S1 and S2 of the transformation unit 300, power is transmitted to the secondary windings S1 and S2 from the primary winding P1, and a current IL of the inductor windings Lo1 and Lo2 increases linearly. In the graph of FIG. 6, Im represents a current flowing through a magnetized inductor, Vab represents a voltage between a node 'a' and a node 'b', Ip represents a current flowing through the primary winding, and I5 and I6 represent currents flowing through the fifth and sixth switches Q5 and Q6, respectively.

FIG. 7A is a view illustrating a conducting state of an integrated magnetic circuit. Here, a current flow is indicated by bold line. FIG. 7B is an equivalent magnetic circuit diagram of the circuit of FIG. 7A. An arrow at the end of each leg indicates a reference direction of a flux rate of the corresponding leg. The flux rate in FIGS. 7A and 7B can be expressed by the following Equation 1. (In FIG. 7B, FL1 and FL2 represent a magnetomotive force of the inductor winding, Fp represents a magnetomotive force of the primary winding, Fs1 and Fs2 represent a magnetomotive force of the secondary windings, Fg1 represents a magnetomotive force of air-gap permeance of the first outer leg, Fg2 represents a magnetomotive force of air-gap permeance of the second outer leg, Fgc represents a magnetomotive force of air-gap permeance of the center leg, Pg represents the air-gap permeance of the first or second outer leg, and Pgc represents air-gap permeance of the center leg.)

Equation 1

$$N_p \Phi'_c = V_g$$

$$N_s \Phi'_c - N_L \Phi'_1 + N_L \Phi'_2 = V_o$$

$$\Phi'_1 + \Phi'_2 = \Phi'_c \quad \text{Equation 1,}$$

where $N_p$, $N_s$, and $N_L$ are the number of turns on the primary winding P1, the number of turns on the secondary windings S1 and S2, and the number of turns on the inductor windings Lo1 and Lo2, respectively, $\Phi'_1$, $\Phi'_2$, and $\Phi'_c$ are flux rates of the first and second outer legs and the center leg, respectively, and $V_g$ and $V_o$ are input DC power and output DC power, respectively. When the Equation 1 is solved, the flow rate of each side can be expressed by the following Equation 2:

$$\Phi'_c = \frac{V_g}{N_p} \quad \text{Equation 2}$$

$$\Phi'_1 = \frac{1}{2}\left\{(1 + N_s/N_L)\frac{V_g}{N_p} - \frac{V_o}{N_L}\right\}$$

$$\Phi'_2 = \frac{1}{2}\left\{(1 - N_s/N_L)\frac{V_g}{N_p} + \frac{V_o}{N_L}\right\}.$$

Figure 8A:
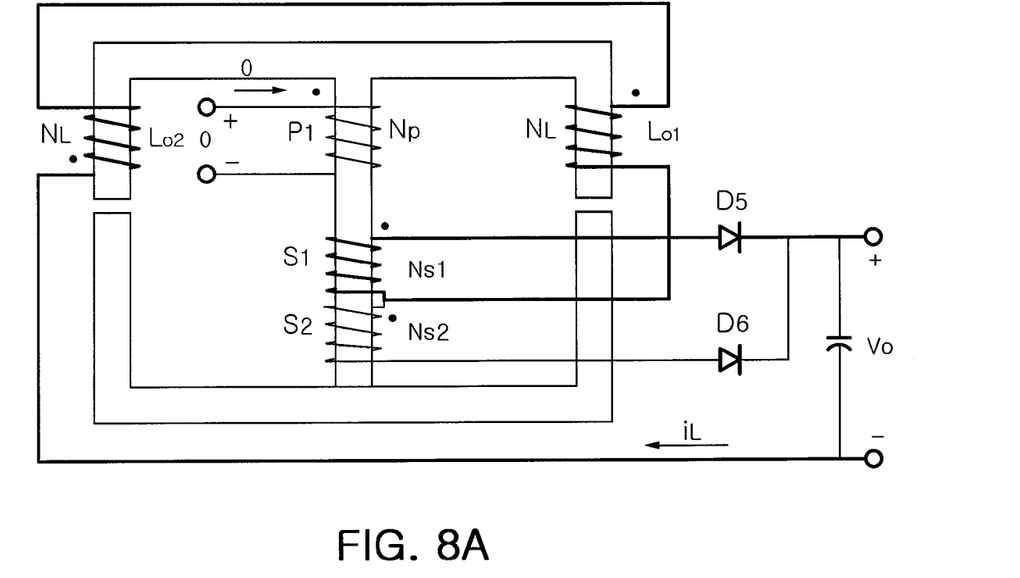
FIGS. 8A and 8B are views illustrating an operation in operation mode 2 shown in FIG. 6.
Figure 8B:
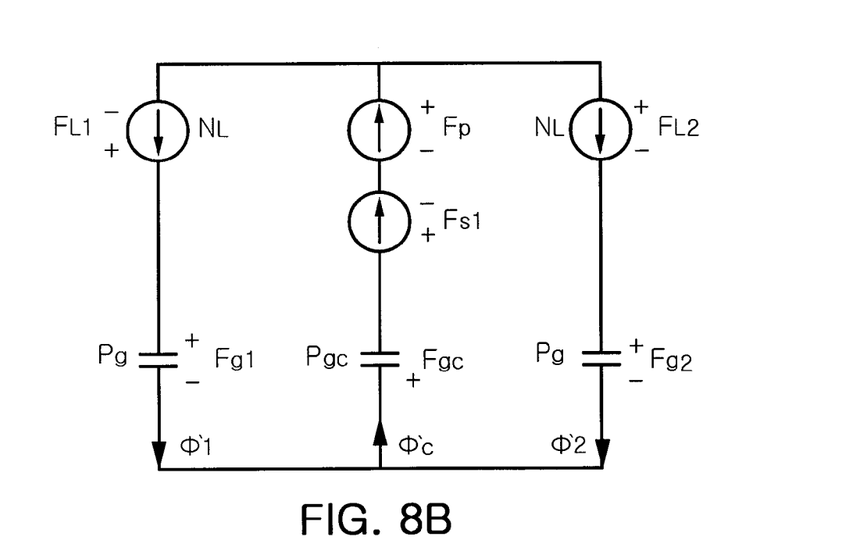

FIGS. 8A and 8B are views illustrating the operation in operation mode 2 of FIG. 6.

Referring to FIGS. 4 and 6, in operation mode 2 (refer to FIG. 6), the first switch Q1 and the second switch Q2 are turned on at the same time, the primary side of the transformation unit 300 is freewheeling, and thus, the secondary side of the transformation unit 300 has a voltage of 0. Therefore, as shown in the graph of FIG. 6, the current IL flowing through the inductor windings is linearly reduced by the fifth switch Q5. FIG. 8A is a view illustrating a conducting state of the integrated magnetic circuit. FIG. 8B is an equivalent magnetic circuit of FIG. 8A. The flux rate from FIGS. 8A and 8B can be expressed by the following Equation 3:

$$N_p \Phi'_c = 0 \Rightarrow \Phi'_c = 0$$

$$N_s \Phi'_c - N_L \Phi'_1 + N_L \Phi'_2 = V_0$$

$$\Phi'_1 + \Phi'_2 = 0 \quad \text{Equation 3.}$$

When the above Equation 3 is solved, the flux rates of the respective legs can be expressed by the following Equation 4:

$$\Phi'_1 = -\frac{V_o}{2N_L} \quad \text{Equation 4}$$

$$\Phi'_2 = \frac{V_o}{2N_L}$$

$$\Phi'_c = 0.$$

In FIG. 6, the operation mode 3 and the operation mode 4 are the same as the above described operation mode 1 and operation mode 3 except for reference character of the input voltage.

Figure 9:
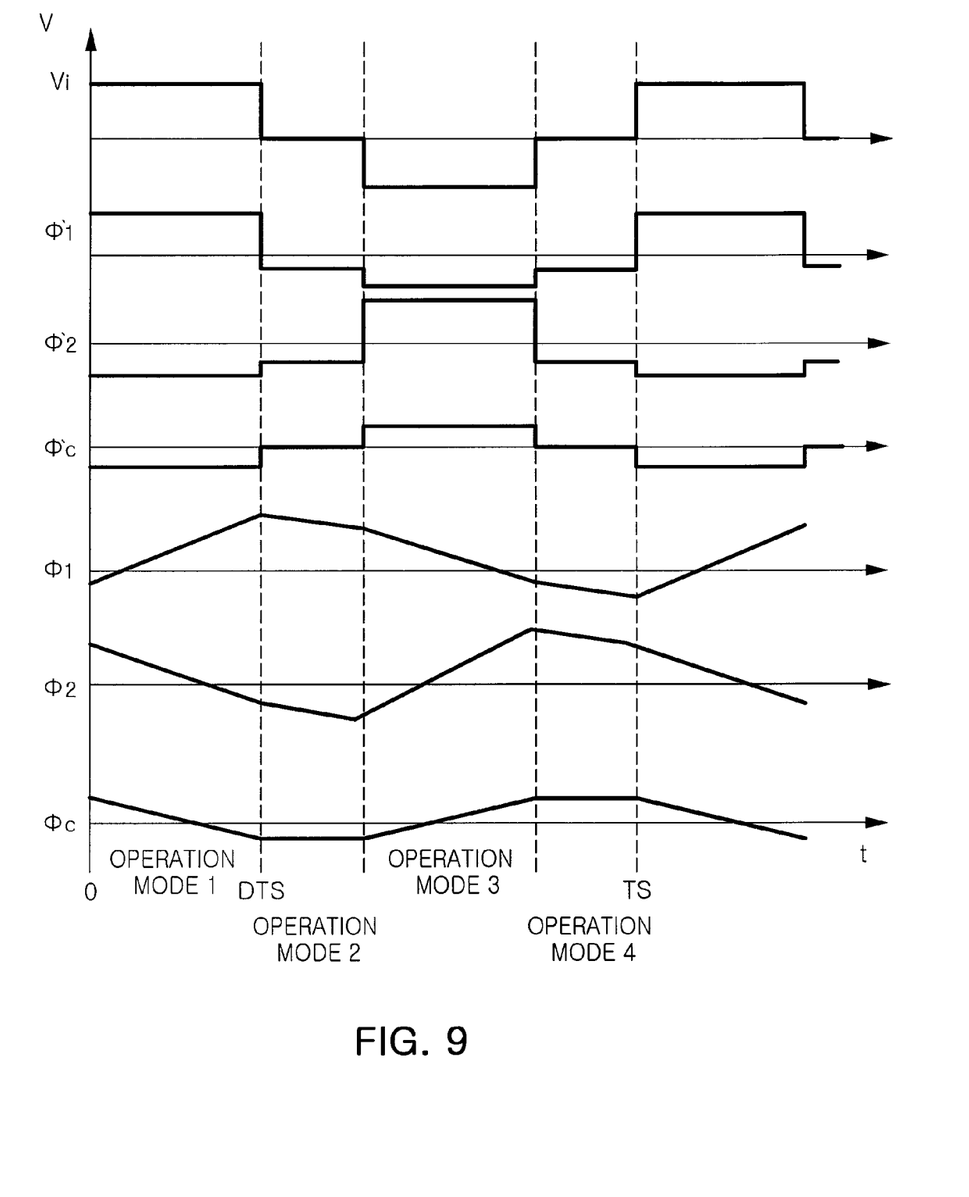
FIG. 9 is a main waveform of a magnetic equivalent circuit, shown in FIG. 7B and FIG. 8B.

FIG. 9 is a main waveform of the magnetic equivalent circuit shown in FIG. 8B. Referring to FIG. 9, flux rates and magnetic flux waveforms of the first and second outer legs and the center leg of the integrated transformer are shown. Here, $\Phi'_1$, $\Phi'_2$, and $\Phi'_c$ are rate values of the magnetic fluxes of the first and second outer legs and the center leg, respectively. $\Phi_1$, $\Phi_2$, and $\Phi_c$ are average magnetic fluxes of the first and second outer legs and the center leg, respectively. As for the magnetic flux of the center leg, AC magnetic flux only flows through the center leg by the transformer. AC magnetic flux is equally divided and flows through the first and second outer legs by the transformer. Here, DC magnetic flux produced by the inductor windings is added to the AC magnetic flux.

Therefore, each of the first and second outer legs has the highest peak value of the magnetic flux, which is a basis for determining a core in the above-described embodiment. That is, when a general core having an outer edge with a larger cross-sectional area than a center edge is used in the integration of the magnetic circuit, the center edge cannot be effectively used, and thus, the core size increases significantly. Therefore, in order to reduce the volume of the core, as shown in FIG. 3, when the core having the outer edges 1 to 1.5 times wider than the center edge is used, maximum power density can be obtained at a given volume of the core.

One of the first and second outer legs is selected. Under the condition that and average flux rate becomes zero, a voltage conversion ratio M(D), shown in FIG. 4, is obtained by the following Equation 5:

$$M(D) = \frac{V_o}{V_g} = 2D\frac{N_s}{N_p}, \quad \text{Equation 5}$$

where D represents a duty ratio in a normal state. Therefore, by appropriately determining the duty ratio and a turns ratio of the integrated transformer, output DC power Vo can be obtained.

Inductance of the inductor windings can be represented by the following Equation 6:

$$L_o = 2N_L^2 P_g \quad \text{Equation 6,}$$

where $P_g$ represents permeance of an air gap located at one outer edge. $P_g$ can be represented by the following Equation 7:

$$P_g = \frac{\mu_0 A_o}{l_g}, \quad \text{Equation 7}$$

where $\mu_0$ represents air permeability, and $A_o$ and $l_g$ represent a cross-sectional area of the first and second outer legs and a length of air gaps formed into the legs, respectively. Peak to peak AC magnetic flux and the magnetic flux of the first and second outer legs can be represented by the following Equation 8:

$$\Delta\Phi_{\text{outer\_leg}} = \frac{V_o}{4f_s}\left(\frac{1}{N_s} + \frac{1-2D}{N_L}\right) \quad \text{Equation 8}$$

$$\Phi_{\text{outer\_leg\_peak}} = N_L P_g I_L + \frac{1}{2} \cdot \frac{V_o}{4f_s}\left(\frac{1}{N_s} + \frac{1-2D}{N_L}\right),$$

where $f_s$ represents a switching frequency of the switching unit 200. In the equation for the maximum magnetic flux, the first term of the right member is DC magnetic flux by the inductor windings, and the second term of the right member is a peak value of AC magnetic flux by the center leg.

Since the DC magnetic flux does not flow through the center leg, the AC magnetic flux by the transformer only exists. The magnitude of the peak to peak AC magnetic flux and the magnitude of the maximum magnetic flux can be represented by the following Equation 9:

$$\Delta\Phi_{center\_leg} = \frac{V_o}{2f_s N_s}$$

$$\Phi_{outer\_leg\_peak} = \frac{V_o}{4f_s N_s}.$$

Equation 9

It can be determined whether magnetic saturation occurs in the core of the transformer on the basis of the maximum magnetic flux density of each leg. Further, core loss in each leg can be obtained on the basis of the AC magnetic flux density.

Figure 10A:
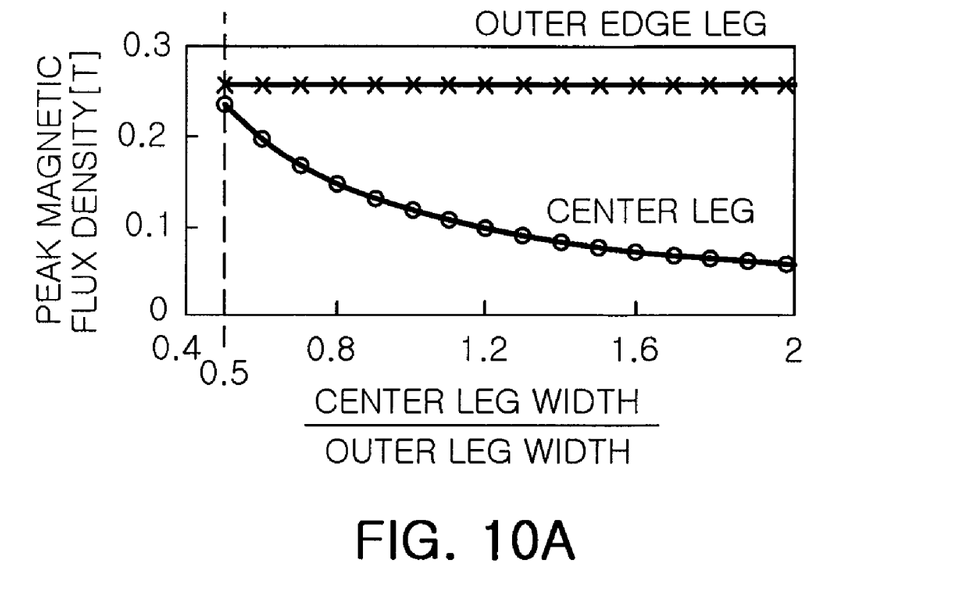
FIG. 10A to 10D are a graph illustrating electromagnetic characteristics of the integrated transformer according to an exemplary embodiment of the invention.
Figure 10B:
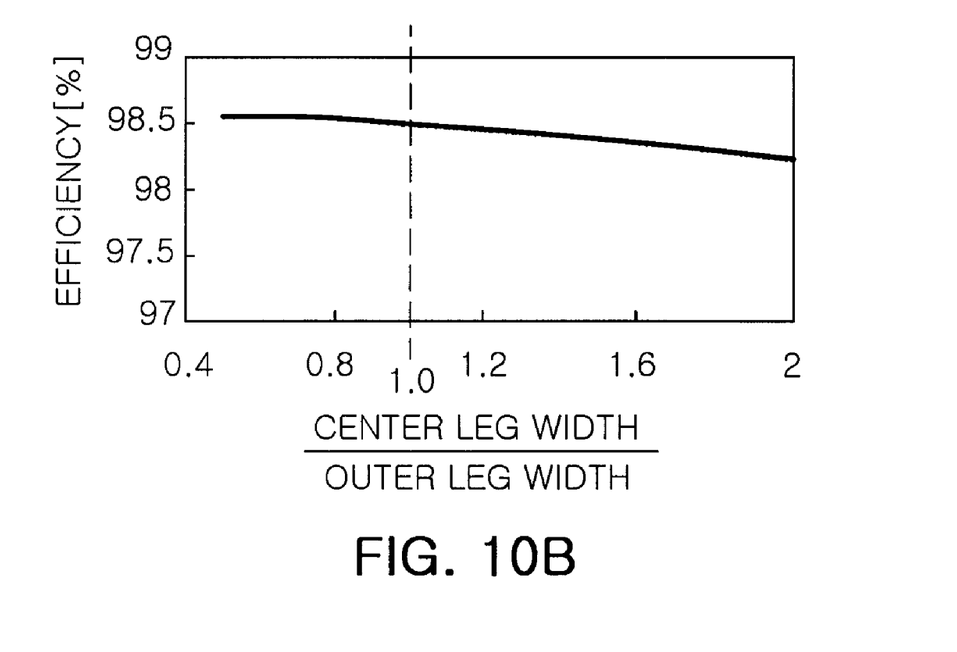
Figure 10C:
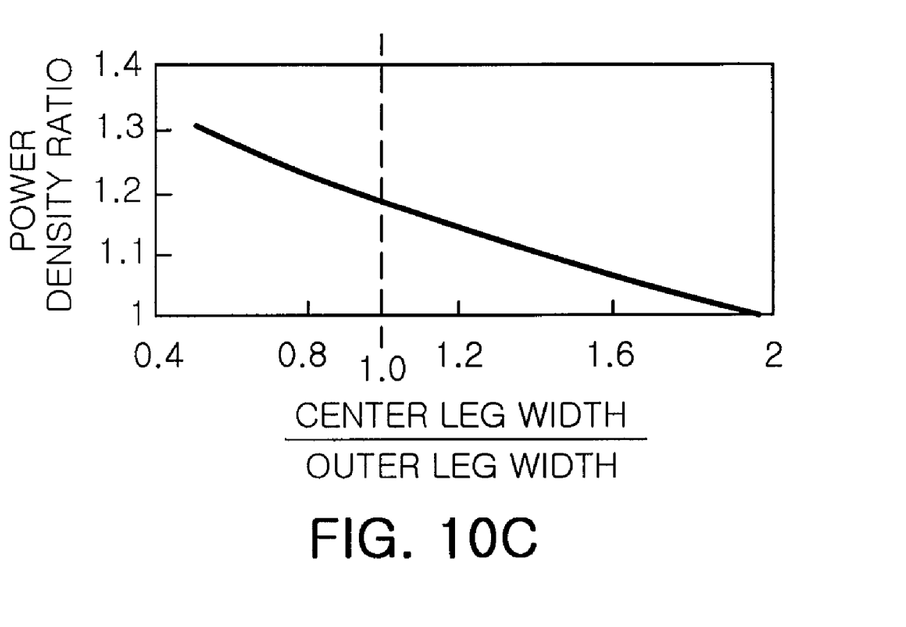
Figure 10D:
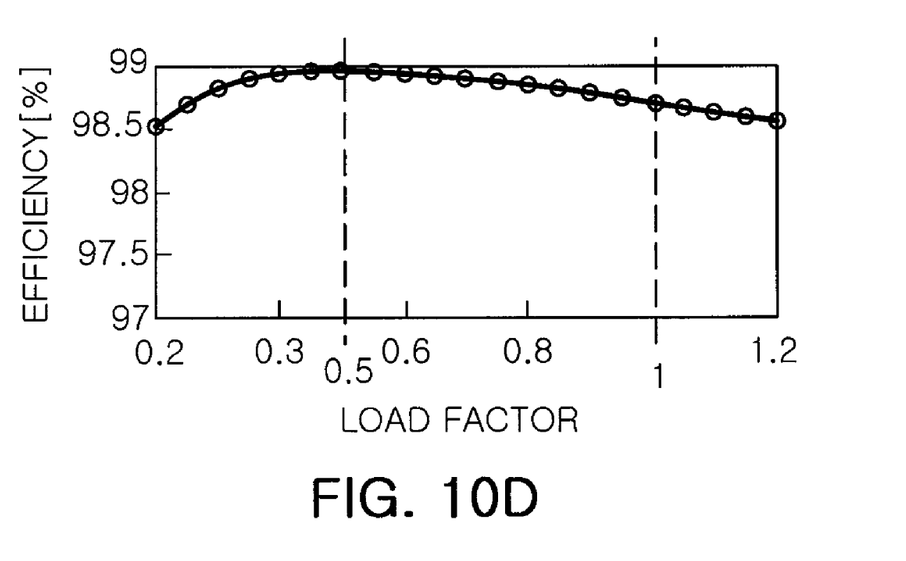

FIGS. 10D to 10D are graphs illustrating electromagnetic characteristics of the integrated transformer according to the exemplary embodiment of the invention. In FIGS. 10A to 10C, at rated load when input DC power in the power supply, shown in FIG. 4, input DC power has a voltage level of 400 V, output DC power is 700 W and has a voltage level of 12 V, the switching unit 200 has a switching frequency of 100 kHz, the turn number $N_P$ of the primary winding P1 is 40, the turn number $N_s$ of the secondary windings S1 and S2 is 2, and the turn number $N_L$ of the inductor windings Lo1 and Lo2 is 1, electric characteristic curves are shown according to a ratio between a width of the center leg and a width of the outer legs of the integrated transformer.

A commercial core generally used in the related art has a ratio of approximately 2 between a width of a center leg and a width of outer legs. In FIG. 10A, since the center leg of the general core has much lower peak magnetic flux density than the outer legs thereof, it cannot be seen that a cross-sectional area of the center leg is effectively used. Therefore, as shown in FIG. 10B, even though the center leg has a larger cross-sectional area than the outer legs, power conversion efficiency decreases. This is because copper loss increases despite a small amount of core loss of the center leg.

On the other hand, like the integrated transformer according to the embodiment of the invention, when the ratio between the width of the center leg and the width of the outer legs is less than 2, it can be seen that the peak magnetic flux density of the center leg increases and that peak magnetic flux density of the center leg starts to increase significantly at the point where the ratio between the width of the center leg and the width of the outer legs is 1. Further, when the ratio between the width of the center leg and the outer legs is ½, the center leg and the outer legs have the same peak magnetic flux density. Therefore, as shown in FIG. 10B, when the ratio of the width of the center leg and the outer legs is less than 2, power conversion efficiency of the center leg increases. In the same manner, as shown in FIG. 10C, as compared with power density of the commercial core having the center leg two times wider than the outer legs, the power density increases by approximately 20% when the center leg and the outer legs have the same width.

Therefore, power conversion efficiency and power density increase significantly when the integrated transformer according to the embodiment of the invention is used.

FIG. 10D is an efficiency curve by a load when the width of the center leg is the same as that of each of the outer legs, each of the legs has the same cross-sectional area, and the width and thickness of the legs are adjusted so that the center leg and the outer legs form a square. Efficiency of 98.7% is obtained at the rated load, and maximum efficiency is obtained at a load of 0.5.

As set forth above, according to the exemplary embodiments of the invention, unlike EE cores or EI cores generally used in the related art, a cross-sectional width of outer edges of a core exceeds 0.5 times a width of the center leg but does not exceed 2 times the width of the center leg, primary and secondary windings that constitute a transformer are wound on the center leg, and inductor windings are wound on the outer legs, such that heat generated during power conversion is dissipated to all of the legs, thermal unbalance is suppressed, a coupling coefficient between the primary and secondary windings increases, and high efficiency of the power conversion can be achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. An integrated transformer comprising:
   a core part comprising:
      first and second supports each having a predetermined length and separated from each other by a predetermined distance, the first and second supports each having one end, the other end provided at a side opposite to the one end, and a middle end provided between the one end and the other end; and
      first and second outer legs and a center leg provided between the first and second supports and magnetically coupled with the first and second supports, the first and second outer legs connecting one set of ends and the other set of ends of the first and second supports to each other, the center leg magnetically connecting the middle ends of the first and second supports to each other; and
   a coil part including a primary winding wound on the center leg, a secondary winding wound on the center leg and electrometrically coupled to the primary winding, and an inductor winding wound on at least one of the first and second outer legs to stabilize power by electromagnetic interaction between the primary and secondary windings,
   wherein a cross-section of the first and second outer legs and a cross-section of the center leg have a width of the first support and a width of the second support in a longitudinal direction, respectively, and a width of each of the first and second outer legs exceeds 0.5 times a width of the center leg but does not exceed 2 times the width of the center leg.

2. The integrated transformer of claim 1, wherein the core part is configured by coupling an EE core or an EI core.

3. The integrated transformer of claim 1, wherein the primary winding, the secondary winding, and the inductor winding are wound in the same direction.

4. The integrated transformer of claim 3, wherein the secondary winding is provided with a center tap electrically connected to the inductor winding.

5. The integrated transformer of claim 1, wherein the inductor winding is divided and wound on the first and second outer legs.

6. A power supply using an integrated transformer, the power supply comprising:
   a switching unit alternately switching input DC power to convert the input DC power into AC power;
   a transformation unit converting a voltage level of the AC power from the switching unit according to a predetermined turns ratio;
   a rectification unit rectifying the AC power from the transformation unit and outputting DC power; and a control unit controlling a switching duty of the switching unit according to a voltage level of the DC power from the rectification unit, wherein the transformation unit comprises:

a core part comprising:

first and second supports each having a predetermined length and separated from each other by a predetermined distance, the first and second supports each having one end, the other end provided at a side opposite to the one end, and a middle end provided between the one end and the other end; and first and second outer legs and a center leg provided between the first and second supports and magnetically coupled with the first and second supports, the first and second outer legs connecting one set of ends and the other set of ends of the first and second supports to each other, the center leg magnetically connecting the middle ends of the first and second supports to each other; and a coil part including a primary winding wound on the center leg, a secondary winding wound on the center leg and electrometrically coupled to the primary winding, and an inductor winding wound on at least one of the first and second outer legs to stabilize power by electromagnetic interaction between the primary and secondary windings.

7. The power supply of claim 6, wherein a cross-section of the first and second outer legs and a cross-section of the center leg have a width of the first support and a width of the second support in a longitudinal direction, respectively, and a width of each of the first and second outer legs exceeds 0.5 times a width of the center leg but does not exceed 2 times the width of the center leg.

8. The power supply of claim 6, wherein the core part is configured by coupling an EE core or an EI core.

9. The power supply of claim 6, wherein the primary winding, the secondary winding, and the inductor winding are wound in the same direction.

10. The power supply of claim 9, wherein the secondary winding is provided with a center tap electrically connected to the inductor winding.

11. The power supply of claim 10, wherein the rectification unit rectifies the AC power from the transformation unit by using a full-wave rectification method or a half-wave rectification method.

12. The power supply of claim 11, wherein the rectification unit comprises:

first and second switches rectifying the AC power from the secondary winding of the transformation unit; and a capacitor forming an LC filter together with the inductor winding to stabilize the power rectified by the first and second switches.

13. The power supply of claim 12, wherein the switch is formed of a diode or a semiconductor switching device including a metal oxide semiconductor field-effect transistor (MOSFET).

14. The power supply of claim 6, wherein the inductor winding is divided and wound on the first and second outer legs.

15. The power supply of claim 6, wherein the switching unit selects one from a full-bridge method, a half-bridge method, and a push-pull method.

16. The power supply of claim 6, wherein the control unit controls a switching duty of the switching unit by using a phase shift pulse width modulation (PWM) method.

17. A power supply using an integrated transformer, the power supply comprising:

a switching unit alternately switching input DC power to convert the input DC power into AC power;

a transformation unit converting a voltage level of the AC power from the switching unit according to a predetermined turns ratio;

a rectification unit rectifying the AC power from the transformation unit and outputting DC power; and a control unit controlling a switching duty of the switching unit according to a voltage level of the DC power from the rectification unit, wherein the transformation unit comprises:

a core part comprising:

first and second supports each having a predetermined length and separated from each other by a predetermined distance, the first and second supports each having one end, the other end provided at a side opposite to the one end, and a middle end provided between the one end and the other end; and first and second outer legs and a center leg provided between the first and second supports and magnetically coupled with the first and second supports, the first and second outer legs connecting one set of ends and the other set of ends of the first and second supports to each other, the center leg magnetically connecting the middle ends of the first and second supports to each other; and a coil part including a primary winding wound on the center leg, a secondary winding wound on the center leg and electrometrically coupled to the primary winding, and an inductor winding wound on at least one of the first and second outer legs to stabilize power by electromagnetic interaction between the primary and secondary windings; and a power factor correction unit rectifying commercial AC power, correcting a power factor of the AC power, and supplying the input DC power.

* * * * *